United States Patent
Kelly

[15] 3,648,282
[45] Mar. 7, 1972

[54] ALARM SIGNAL APPARATUS TO INDICATE DAMAGE TO THE INSULATION OF AN ELECTRICAL CABLE AS IT IS BEING LAID UNDERGROUND

[72] Inventor: John B. Kelly, 2205 54th Ave. E., Tacoma, Wash. 98424

[22] Filed: Feb. 17, 1970

[21] Appl. No.: 11,964

[52] U.S. Cl. ............................ 340/421, 37/193, 61/72.4, 324/54, 340/255
[51] Int. Cl. ............................................. G08b 21/00
[58] Field of Search .................. 340/421, 255, 267; 324/54; 61/72.4; 37/193

[56] References Cited

UNITED STATES PATENTS

| | | |
|---|---|---|
| 1,938,684 | 12/1933 | Bond et al.............................324/54 |
| 1,724,565 | 8/1929 | Dana...................................324/54 X |
| 3,140,745 | 7/1964 | Hinkle et al.........................61/72.4 X |
| 1,950,484 | 3/1934 | Clarvoe..............................340/421 X |
| 2,131,291 | 9/1938 | Maust...................................340/421 |
| 2,561,152 | 7/1951 | Stryker.................................340/421 |

*Primary Examiner*—David L. Trafton
*Attorney*—Roy E. Mattern, Jr.

[57] ABSTRACT

During underground cable laying operations of electrical cables such as power, telephone, and TV cables, a cable damage alarm signal apparatus is secured to cable laying machinery equipped with a combined plow tooth and cable chute. This cable damage alarm signal apparatus has a detection circuit connected between the metal sheath of the cable, or alternatively its inner conductor, and the frame of the cable laying machinery. Upon damage of the insulation of the cable, current flows in the detection circuit and the alarm circuit is energized.

15 Claims, 3 Drawing Figures

INVENTOR
JOHN B. KELLY

BY
Roy Mattern Jr.
ATTORNEY

3,648,282

ALARM SIGNAL APPARATUS TO INDICATE DAMAGE TO THE INSULATION OF AN ELECTRICAL CABLE AS IT IS BEING LAID UNDERGROUND

BACKGROUND OF INVENTION

In laying buried cable by using plowing techniques, it is often damaged due to hazards such as rocks, stumps, pipes, and operator negligence in manipulating the machinery. The cable damage has in the past varied from small holes to large gashes involving many feet of cable. Since the plowed in buried cable is not visible after it is placed in the earth, persons laying it have no way of knowing where and how much damage has been incurred.

Presently, in determining whether or not damage has occurred, one method used to determine the condition of buried cable is to place air on the cable prior to plowing and then checking the air pressure again upon completion of the plowing operation. Another method is to place air on the cable after the plowing operation and then rechecking the air at a later date. A third method involves electrically testing the conductors for shorts, grounds and opens after the cable has been placed in the earth.

A fourth method attempts to make the determination sooner. It is used when cables are kept under air pressure and an air sensitive device is placed on the cable reel to detect changes in air pressure. However, this latter detection method does not respond fast enough to be of any practical value in determining the location of cable damage. Also it may not be used under many conditions. For example, during the cable placing operation it is often necessary to cut the cable at rail and road crossings and bridges, thus losing air pressure on the cable. It is also limited in use since certain types of cable such as power cable and coax cable cannot be placed under air pressure.

SUMMARY OF INVENTION

To overcome these drawbacks of late determinations of when and where buried cable has suffered unwanted damage, this invention detects, at the time of occurrence, damage to cable caused in many ways such as by the plow or other sharp objects puncturing the cable during the placing operation. The operator of the cable laying machinery and/or those assisting him are instantaneously alerted visually and/or audibly that cable damage has occurred. This is accomplished by securing electrical apparatus primarily to the cable laying machinery and arranging its detection and alarm circuits to become immediately activated upon the occurrence of cable damage. The apparatus therefore is referred to as a cable damage alarm. It becomes active when cable damage removes insulation from a conducting portion of the cable as it is being laid.

DRAWINGS OF A PREFERRED EMBODIMENT

DESCRIPTION OF THE PREFERRED EMBODIMENT

Arrangement

Figure 1:
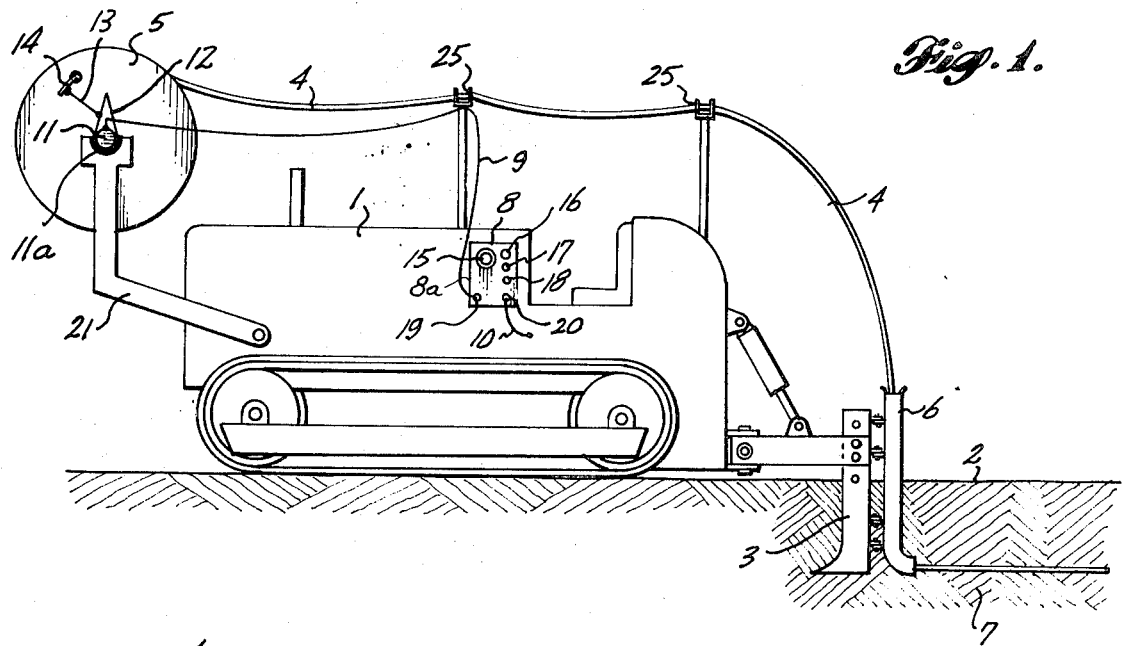
FIG. 1 is a side elevation diagrammatic view, with earth portions removed, of a tractor equipped with a cable reel, cable leads, a cable plow and chute assembly and the cable damage alarm.

The cable damage alarm 8, except for connecting leads is essentially contained in a housing 8a. As illustrated in FIG. 1, housing 8a is secured by fasteners, not shown, to a tractor 1. The tractor 1 is also equipped with a cable reel 5, steel mandrell 11, reel carrier 21, cable guides 25, and plow tooth 3 having in turn a cable chute 6.

Cable 4 is taken from reel 5 and passed through cable guides 25, and on into cable chute 6. As tractor 1 is driven by an operator along the earth 2, the cable feeds through cable chute 6 down into the earth, 2.

Due to hazards such as rocks, stumps, pipes and other underground obstructions, generally designated by numeral 7, which fail to properly respond to the action of the plow tooth 3, and return to press against the cable 4, it is often damaged. Also irregular operations of the machinery may cause cable damage. When damage occurs and insulation is removed, a visual and/or audible alarm is energized.

To be in constant readiness to be operative, cable damage alarm 8 is constructed and connected respectively, on its exterior and in its interior as follows:

On its exterior, negative lead 9 of cable damage alarm unit 8 is connected to reel mandrel 11 using a standard electrical insulated conductor and connections. The reel mandrel 11 is insulated from reel carrier 21 by any suitable means such as conventional rubber or plastic insulators 11a. Current from reel mandrel 11 is collected on cable reel 5 by use of a collector spring 12 of standard manufacture. A jumper cord 13, is provided from collector spring 12 to the inside end of cable 14. The jumper cord 13 is connected to the collector spring 12 and to the metal sheath 27 or the conductors 30 of the inside end of cable 14 in a conventional manner. As shown reel 5 is made of wood. Some reels are made of metal. If so, some of this current wiring may be eliminated. A positive conductor 10 is provided from the cable damage alarm unit 8 to the metal chassis of the tractor 1. The positive conductor 10 is connected to the cable damage alarm unit 8 using a standard locking-type connector 20 and it is readily connected to the tractor 1 chassis; and On its interior, cable damage alarm unit 8 is equipped with a detection circuit and an alarm circuit. The detection circuit consists of a direct current power supply 24, a on-off switch 18, a variable resistor 34, a ultrasensitive direct current relay 23, a press to test switch 17, and a test load resistor 22 all of which are standard commercial items. The alarm circuit consists of direct current power supply 31, optional leads 36, 38 to connect to a tractor 1 power supply, an alarm light 16 and an alarm horn 15 which are all standard commercial items. Also lights and horns of a tractor could be interconnected. Optionally, a key 40 and its circuit could be used to connect to an external transmitter or tractor horn and/or light. Such connections to a light and/or a horn of the tractor, and/or to a transmitter would be made at terminals 42, 44.

Test and Normal Operation

In use, the operator of the cable laying machinery 1, prior to beginning the plowing operation connects the cable damage alarm unit 8 to the cable shield or sheath 27 or the conductors 30 and to the chassis of tractor 1. He then turns the on-off switch 18 to the on position. Then by depressing the "press to test" switch negative current flows from the battery 24, through the on-off switch 18, through the variable resistor 34, through the windings of the relay 23, through the resistor 22, through the press to test switch 17 and on to the positive side of the battery 24. The current flowing through the relay 23 closes the contacts 32 in the alarm circuit. Current from the alarm circuit battery 31, flows simultaneously through the alarm light 16 and the alarm horn 15 resulting in a visual and audible indication. Thus the entire cable damage alarm unit 8 circuitry is checked for correct operation. The test resistor 22 assures that the sensitivity of the detection circuit is adequate for operation.

What Alarm Occurs Upon Damage to the Cable

Figure 2:
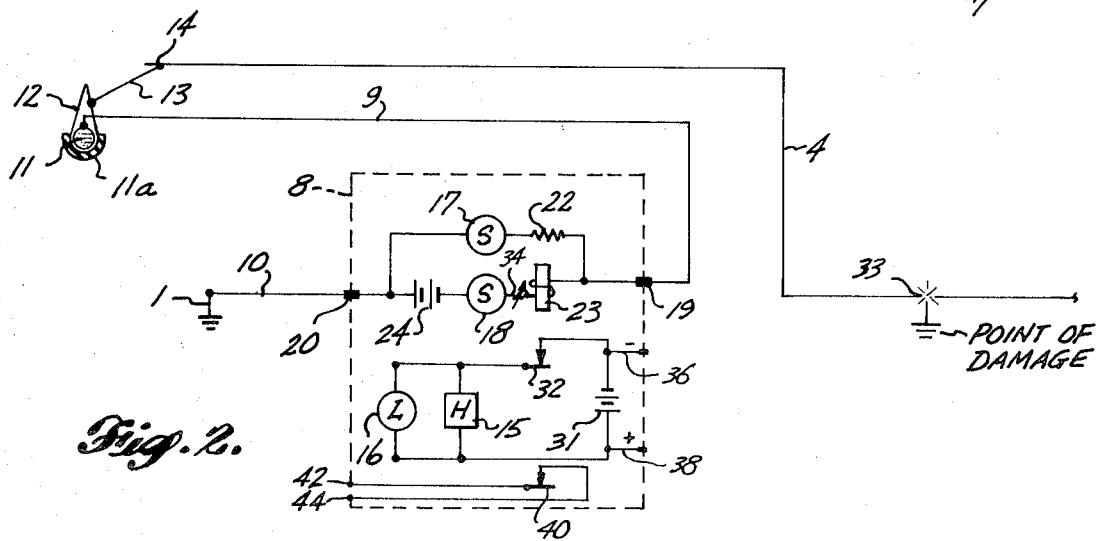
FIG. 2 is a schematic wiring diagram of the cable damage alarm.
Figure 3:
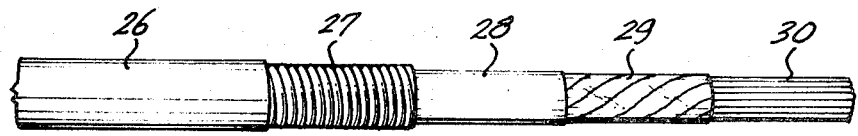
FIG. 3 is a portion of one type of cable with various layers of insulating and conducting materials removed to illustrate its construction and how it may become an active part of the overall detection circuit when cable damage occurs.

During the plowing operation, should the cable chute 6 or some underground object 7 puncture the cable 4, a current flow will occur from the negative side of the detection circuit battery 24, through the on-off switch 18, through the variable resistor 34, through the relay 23, through the negative conductor 9 and on to the mandrel 11. From mandrel 11, the current is picked up by the collector spring 12 and passes through the jumper cord 13 to the metal sheath 27 or the conductors 30 of the cable 4 as shown in FIG. 1. The current then flows along the metal sheath 27 or the conductors 30 of the cable 4 to the point of damage 33 as shown in FIG. 2. If the damage is caused by the cable chute 6, the current will flow from the metal sheath 27 or the conductors 30 to the cable chute 6, through the plow 3, then through the tractor chassis 1 to the positive conductor 10 and on to the positive side of the detection circuit battery 24. If the damage is caused by an underground object 7 illustrated in FIG. 1, the current flow will be from the point of damage 33 through the earth 2 to the plow 3, through the tractor chassis 1 to the positive conductor 10 and on to the positive side of the detection circuit battery 24. In either situation the current flow through the relay 23 closes the contacts 32 and closes a circuit to the alarm light 16 and the alarm horn 15, thus giving the operator of the cable laying machinery 1, an instantaneous visual and audible alarm that cable damage has occurred. The alarm circuit may, optionally key a transmitter, not shown, to send a signal to a receiver being carried by others assisting and/or supervising the operators.

Repairs are Immediately Undertaken

When the cable damage alarm 8 is activated, the operator stops the tractor 1 and turns off the cable damage alarm unit 8 by moving the on-off switch 18 to the off position. In this way he conserves the batteries during the period the cable damage is being located and isolated. He then raises the plow 3 out of the earth. Thereafter cable 4 is removed from cable chute 6 and inspected for damage. If the damage is not found at this plow location, the cable 4 is pulled out of the earth 2 through the slot left by the plow 3 until the damage is found. Upon location of the damage, the effected area of the cable 4 is temporarily repaired, to isolate the metal sheath 27 or the conductors 30 from the earth, until final repair is subsequently undertaken by another repair crew. After the temporary repairs have been made the operator of the cable laying machinery turns the cable damage alarm unit 8 on-off switch 18 to the on position. If the alarms 15 and 16 are not activated, this indicates that all the trouble has been cleared and the plowing operation may proceed.

Resistor Sizes

In one embodiment of the cable damage alarm 8, resistance 22 is 80,000 ohms and variable resistance 34 is changeable from 0 to 45,000 ohms in adjusting the sensitivity of the overall alarm circuits to prevailing changeable conditions caused by weather, etc., under field conditions.

SUMMARY OF THE ADVANTAGES

By installing a cable damage alarm on cable laying machinery, any damage destroying the insulation of the cable being buried is instantaneously indicated. Subsequently, the visual inspection is quickly undertaken to find the damage at the plow, its chute or just beyond, thus eliminating the necessity to uncover extensive lengths of cable to find its damaged insulative portion.

All this is accomplished by conveniently securing a relatively small cable damage alarm system to the cable laying machinery. In no way does its installation adversely effect the operation of such machinery, but rather it enhances the overall value of the machinery by insuring the cable is laid without undetected damage and awaits its intended utilization.

I claim:

1. A cable damage alarm adaptable for use in conjunction with underground cable laying machines to instantaneously indicate to operators of cable laying machinery that the insulation of a cable being placed underground has been damaged and it is in need of immediate repair, comprising:

a. a detection circuit to be completed upon an occurrence of cable insulation damage, comprising in turn, a source of electrical energy, a relay coil, connected to the source of electrical energy, a ground circuit lead connected to the source of electrical energy and adapted for connection to cable laying machinery, and a lead connected to the relay coil and adapted for a rotatable electrical connection to a cable end secured to a cable reel and insulated from the cable laying machinery; and b. an alarm circuit to be completed upon the operation of the relay coil of the detection circuit, comprising in turn, a source of electrical energy, a switch connected to the source of electrical energy and to be closed upon operation of the detection circuit relay coil, alarm rendering means (, and leads to join these members of this alarm circuit) connected between the source of electrical energy and the switch.

2. A cable damage alarm, as claimed in claim 1, wherein the alarm rendering means, comprises an audible warning signal.

3. A cable damage alarm, as claimed in claim 1, wherein the alarm rendering means, comprises a visual warning signal.

4. A cable damage alarm, as claimed in claim 1, wherein the alarm rendering means, comprises both visual and audible warning signals.

5. A cable damage alarm, as claimed in claim 1, wherein the alarm rendering means is capable of keying an external transmitter which transmits an alarm signal to be picked up by a receiver carried by a superintendent.

6. A cable damage alarm, as claimed in claim 1, wherein the detection circuit comprises a collector spring means used in making the rotatable electrical connection to a cable end secured to a cable reel.

7. A cable damage alarm, as claimed in claim 1, wherein the detection circuit has an on and off switch.

8. A cable damage alarm, as claimed in claim 1, wherein the detection circuit has a testing circuit branch including a test switch.

9. A cable damage alarm, as claimed in claim 8, wherein the testing circuit branch has a resistor for assurance of the sensitivity of the testing circuit to match the anticipated overall detection circuit operation upon the occurrence of actual damage to the insulation on a cable being laid underground.

10. In a combination with a cable laying machine, a cable damage alarm to immediately indicate to observers of cable laying machinery that the insulation of a cable being placed underground has been damaged and it is in need of repair, comprising:

a. cable laying machine having cable reel dispensing accessories, a chassis and a ground plow and cable chute secured to the chassis;

b. a cable damage alarm comprising, in turn, 1. a detection circuit to be completed upon an an occurrence of cable insulation damage, having a source of electrical energy, a relay coil connected to the source of electrical energy, a ground circuit lead connected to the source of electrical energy and connected to the chassis of the cable laying machine, and a negative lead connected to the relay coil and adapted to be rotatably connected to a cable end secured to the cable reel and insulated from the cable laying machinery; and 2. an alarm circuit to be completed upon the operation of the relay coil of the detection circuit, comprising in turn, a source of electrical energy, a switch connected to the source of electrical energy and to be closed upon operation of the detection circuit relay coil, alarm rendering means (, and leads to join these members of this alarm circuit) connected between the source of electrical energy and the switch.

11. A cable damage alarm, as claimed in claim 1, wherein connection means are provided to connect the tractor horn and light to the alarm circuit.

12. A cable damage alarm, as claimed in claim 1, wherein connection means is provided to connect the tractor horn to the alarm circuit.

13. A cable damage alarm, as claimed in claim 1, wherein connection means is provided to connect the tractor light to the alarm circuit.

14. A cable damage alarm, as claimed in claim 1, wherein a connection means is provided to connect the tractor DC power electrical source to the alarm circuit.

15. A cable damage alarm, as claimed in claim 1, wherein the detection circuit has a variable resistor to adjust the sensitivity of the detection circuit to meet variable field conditions.

* * * * *